United States Patent [19]

Meunier

[11] Patent Number: 5,081,458
[45] Date of Patent: Jan. 14, 1992

[54] HYPERFREQUENCY SYSTEM FOR REMOTE DATA TRANSMISSION

[75] Inventor: Christian A. Meunier, Chatou, France

[73] Assignee: Compagnie de Signaux et d'Equipements Electroniques, Montrouge, France

[21] Appl. No.: 652,020

[22] Filed: Feb. 7, 1991

[30] Foreign Application Priority Data

Feb. 9, 1990 [FR] France ................... 90 01537

[51] Int. Cl.$^5$ .................. G01S 13/74; G08B 13/14
[52] U.S. Cl. .............................. 342/44; 342/51; 340/572; 340/825.54
[58] Field of Search .............. 342/44, 51; 340/825.54, 340/572

[56] References Cited

U.S. PATENT DOCUMENTS

| | | | |
|---|---|---|---|
| 3,366,952 | 1/1968 | Mori | 342/44 |
| 3,774,205 | 11/1973 | Smith et al. | 342/44 |
| 4,724,427 | 2/1988 | Carrol | 340/572 |
| 4,724,443 | 2/1988 | Nysen | 342/700 MS |
| 4,786,907 | 11/1988 | Koelle | 342/51 |
| 4,899,158 | 2/1990 | Saeki et al. | 342/44 |

*Primary Examiner*—Gilberto Barrén, Jr.
*Attorney, Agent, or Firm*—Zarley, McKee, Thomte, Voorhees & Sease

[57] ABSTRACT

Hyperfrequency system for remote data transmission of the type comprises at least one reader (L) associated with a plurality of responders (R) with the reader (L) comprising means to generate a hyperfrequency wave which has a certain rectilinear polarization, while each responder (R) is fitted with a rectangular flat antenna for reemission (1) which is capable of receiving said hyperfrequency wave and reemitting it with orthogonal polarization and phase modulation at two stages representing the data to be transmitted to reader (L), characterized in that the phase modulation is achieved by two transistors (Qa, Qb) which are connected respectively to two adjacent corners (a, b) of antenna (1), these two transistors being alternately blocked and saturated at the rhythm of the data to be transmitted, by additional control signals originating in an appropriate processing unit (4) in order to short circuit alternately the corresponding corner of the antenna.

8 Claims, 2 Drawing Sheets

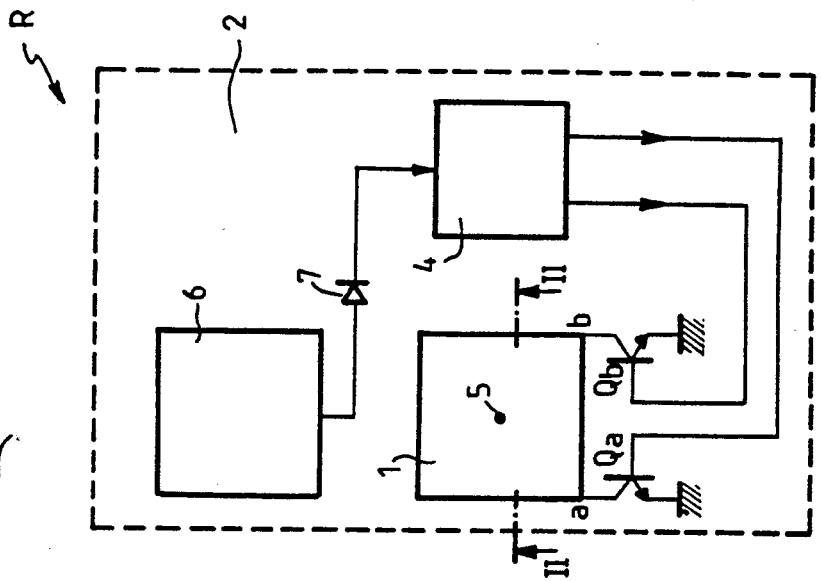
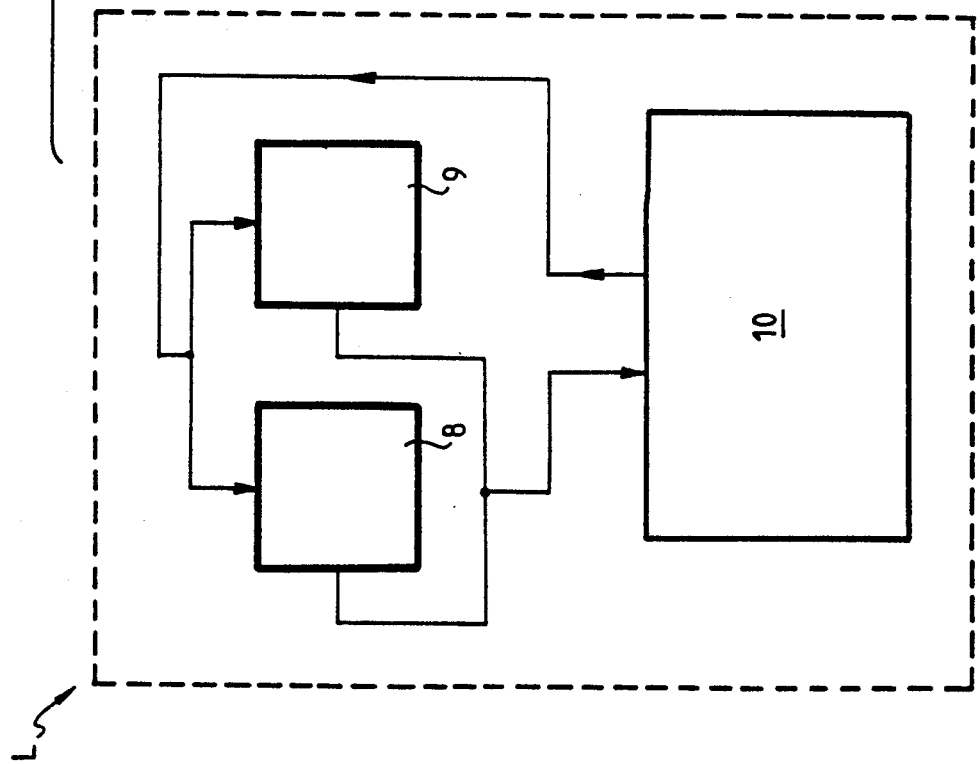
FIG.1
FIG.2

HYPERFREQUENCY SYSTEM FOR REMOTE DATA TRANSMISSION

The present invention relates to a hyperfrequency system for remote data transmission of the type consisting of at least one reader associated with a plurality of responders, with the reader comprising means to generate a hyperfrequency wave with a certain rectilinear polarization, while each responder is fitted with a rectangular plane antenna for reemission which is capable of receiving said hyperfrequency wave and reemitting it with an orthogonal polarization with a phase modulation with two stages representing the data to be transmitted to the reader.

Such systems have numerous applications, particularly in the case where one of the elements, the reader or the responder, is carried by a mobile which is capable of moving at very high speed. Among these applications one can mention, for example, the identification of vehicles in train or road transport, contactless car travel tolls, the control of access, or train transport localization.

Unfortunately, the known systems of this type are at the present time still much too expensive to be used industrially. Indeed, the different applications considered require a great number of responders. The responders must remain very simple so that the price is affordable, which in particular excludes the use of conventional phase modulators.

The principal purpose of the present invention is to remedy this drawback and, for this purpose, the invention relates to a system for the transmission of data of the above-mentioned type which is characterized essentially in that the phase modulation is achieved by two transistors which are connected to two adjacent corners of the antenna, respectively, and these two transistors are alternately blocked and saturated at the rhythm of the data to be transmitted, by additional control signals originating from an appropriate processing unit to alternately short circuit the corresponding corner of the antenna.

Thanks to this arrangement and as will be shown more clearly subsequently one achieves in a very simple manner a phase modulation with two stages of the hyperfrequency wave which is reemitted with orthogonal polarization.

Preferably, the flat antenna of the responder is constructed in the form of a printed circuit on an insulating substrate whose backside is entirely metallized and constitutes a reference plane.

In one particular embodiment of the invention the two transistors consist of bipolar transistors whose emitter-collector junction is connected between the corresponding corner of the antenna and the reference plane, and the base is connected to the processing unit.

Thus, the phase modulation is obtained by two entirely conventional components which are inexpensive.

Advantageously, the flat antenna of the responder has a square shape and it comprises in its center a metallized hole which establishes an electrical contact between the active side of the antenna and the reference plane located at the back, which permits rapid elimination of static charges of the junctions of the two transistors.

Also, preferably, the reader comprises means for modulating the amplitude of the hyperfrequency wave generated, while the responder comprises a second flat antenna which is called the reception antenna associated with a nonlinear detection element; detection by the responder of this modulation of amplitude results in activation of the processing unit.

This permits saving the energy source of the responder which thus remains passive in the absence of a reader within reception reach.

Moreover, the reader also comprises means to modulate the pulse of the generated hyperfrequency wave in order to transmit predetermined data to the responder.

One can thus inscribe a message in a destination memory zone of the responder, or one can control the transmission of the data which are in a predetermined memory zone of the responder.

According to a particular embodiment of the invention the nonlinear detection element consists of a Schottky diode.

One embodiment of the invention is described below as an example, with reference to the appended drawings, in which:

FIG. 1 represents a very simplified drawing of a system for remote data transmission according to the invention;

FIG. 2 is a cross section showing the structure of the reemission antenna of the responder;

Figure 3:
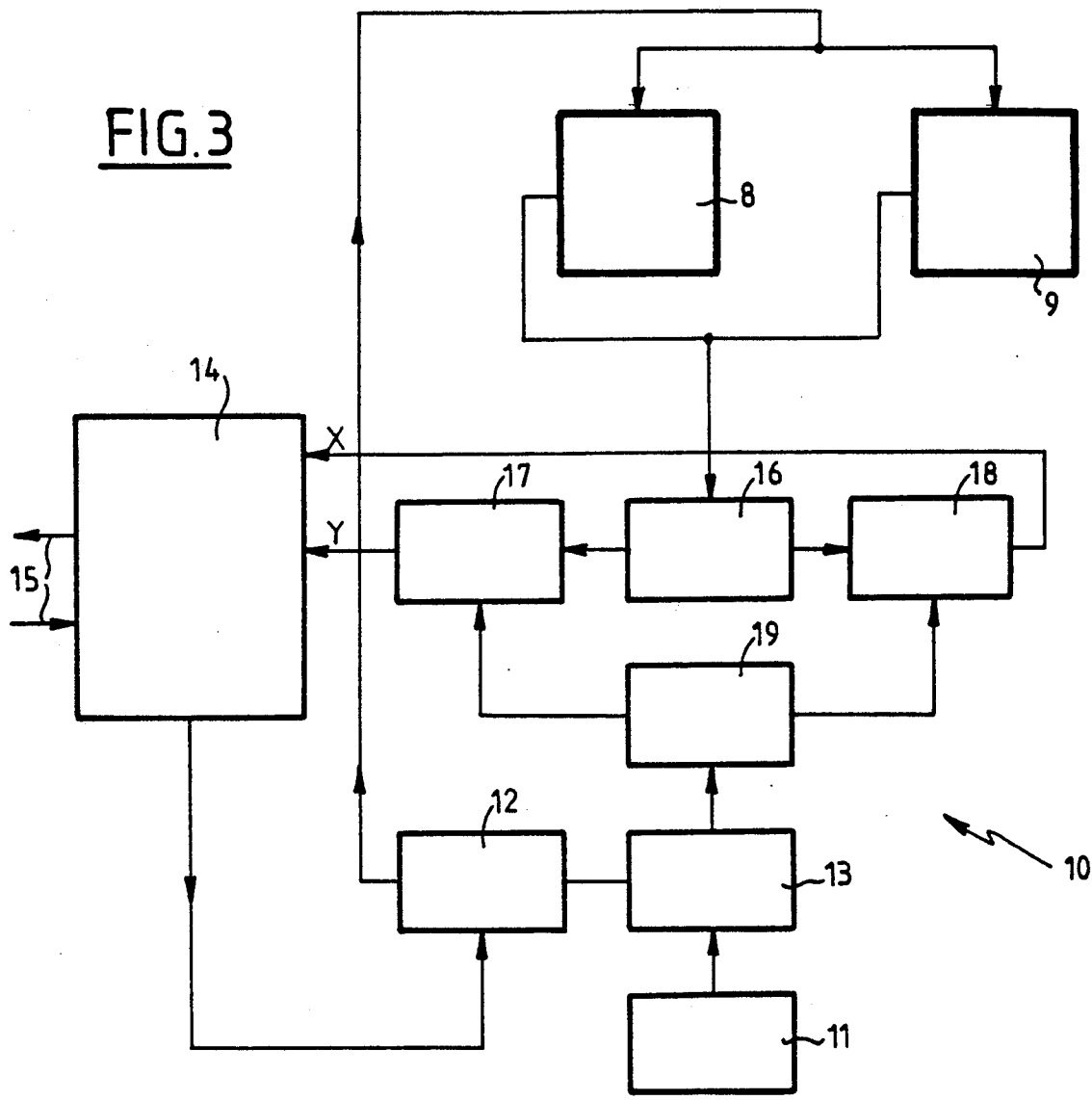
FIG. 3 is a synoptic diagram of the reader.

The system for the transmission of data represented in FIG. 1 consists of at least one reader such as L, associated with a plurality of responders R, only one of which has been represented here. In a manner which in itself is known, reader L comprises means which will be described later in detail capable of generating a hyperfrequency wave with a certain rectilinear polarization, for example a vertical polarization, while responder R reemits said hyperfrequency wave with orthogonal polarization, or in this case a horizontal polarization, with phase modulation at two stages representing the data to be transmitted to reader L.

For this purpose, responder R consists first of all of a flat square antenna called reemission antenna (1). As one can see more clearly in FIG. 2, this antenna (1) is made in the form of a printed circuit on an insulating substrate (2), for example made of epoxy glass, whose backside which is entirely metallized constitutes a reference plane (3).

According to the invention, two adjacent corners a and b of antenna (1) are connected to the ground, which takes the form of reference plane (3), through the intermediary of the emittercollector junction of a bipolar transistor, respectively Qa and Qb. The two transistors are alternately blocked and saturated at the rhythm of the data to be transmitted by additional control signals which are applied to their base and which originate in an appropriate processing unit (4). The processing unit comprises an analog part and a logical part consisting primarily of a live memory divided into zones.

Moreover, antenna (1) is fitted at its center with a hole (5) which is metallized and provides an electrical connection between the active side of the antenna and reference plane (3) located on the back side, which permits more rapid elimination of static charges present on the junction of transistors Qa and Qb.

In practice, the hyperfrequency wave generated by reader L is modulated in amplitude. In fact, two modulations are used. One is permanent, sinusoidal and with low rate, for example 10%, and serve to "awaken"

responder R so that the latter consumes energy only in the presence of reader L. The other modulation, an all-or-nothing step, is intended to transmit data or commands with the destination of the responder.

The permanent modulation of amplitude does not interfere with the reader and it can be neglected. In contrast, in the presence of modulation by an all-or-nothing pulse, the reading is interrupted, although responder R continues to modulate the phase of the hyperfrequency wave received.

To detect the modulation of the amplitude of the hyperfrequency wave transmitted by reader L, responder R is fitted with a second square flat antenna (6), called reception antenna, which is constructed in the same manner as reemission antenna (1). This antenna (6) is associated with a nonlinear detection element (7) which consists here of a Schottky diode whose output is connected to processing unit (4).

Reader L consists essentially of two square flat antennas (8) and (9) which are associated with circuit (10) represented in detail in FIG. 3. This circuit comprises first a hyperfrequency source (11), for example a 2.45-GHz source, which affects modulator (12) through the intermediary of a directive coupler (13). Modulator (12) receives the wanted modulation, that is the permanent sinusoidal modulation, for example 1 kHz, or the logical signals which contain the data to be transmitted to responder R, or a processing circuit for the signal (14) which is in communication with the outside through links (15).

The output of modulator (12) is applied to vertical accesses of the two antennas (8) and (9) which create a hyperfrequency field with vertical rectilinear polarization. This group of two flat antennas forms a network whose characteristic is to impart to an antenna formed in this manner a diagram whose opening forms an 85 angle in the vertical plane and 60 angle in the horizontal plane. Naturally, the formation of another network would permit the obtention of different openings, depending on the intended applications. In addition, one can note that these antennas are constructed in the same manner as the responder antenna, that is in the form of a printed circuit using the microstrip technology.

The horizontal accesses of antennas (8) and (9) are coupled at (16), and the sum is applied to two synchronous detectors (17) and (18). A part of the energy of the hyperfrequency source (11) is removed by coupler (13) to be applied to the local oscillator input of the two synchronous detectors (17) and (18) through the intermediary of dephaser $\lambda/219$. In this manner one obtains at the output to signals X and Y which are applied to signal processing circuit (14) and which represents the data transmitted by responder R with phase modulation.

The operation of the data transmission system according to the invention will now be described in greater detail.

Reader L sends a hyperfrequency wave with vertical polarization, modulated permanently by an amplitude modulation at 1 kHz with low rate. When responder R is in the field of reader L, it detects this modulation at 1 kHz through the intermediary of reception antenna (6) and Schottky diode (7), which "wakes up" the logical part of processing unit (4) and the interface between the signal detected by reception antenna (6) and the numerical input of the logical part. The logical part then transmits to transistors Qa and Qb two additional signals which represent the data from a predetermined memory zone.

Transistors Qa and Qb are thus alternately blocked and saturated by these additional signals at the rhythm of the data to be transmitted. In practice, each one of the transistors is connected to the corresponding corner of antenna (1) by a line which is made of micro-strip whose length is equal to one-fourth of the wave length $(\lambda)/4$).

The impedance of the saturated transistor is very low and it is assumed to be 0, but the quarter-wave link to the corresponding corner of antenna (1) effects a $1/Z$ transformation, which is equivalent to a very high impedance. Reciprocally, the blocked transistor has a very high impedance which can be assumed to be infinite, but the quarter-wave link to the corresponding corner of antenna (1) also effects a-$1/Z$ transformation, equivalent to an impedance of approximately 0. The impedance of the quarter-wave line which connects a to Qa and b to Qb is selected to ensure the transformation into $1/Z$ under the best conditions of yield.

Figure 4:
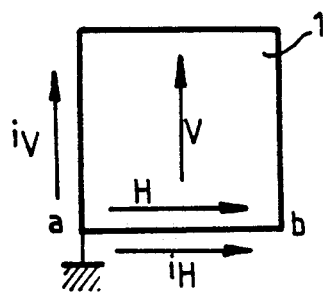
FIGS. 4 and 5 are diagrams explaining the principle of phase modulation according to the invention.

Let us assume, for example, as shown in FIG. 4, that one establishes a short circuit between corner a of antenna (1) and the reference plane. One can note that in this type of antenna, the active parts are localized on the edges. The antenna is subjected to the hyperfrequency field with vertical polarization, V, generated by reader L, and this field generates a current iv. Subsequently, a current iH is generated on the adjacent edge of the antenna to annul the current at the short circuit point a. This current iH in turn generates a field H which is orthogonal to the received field V and which has the same modulus, not considering losses.

Figure 5:
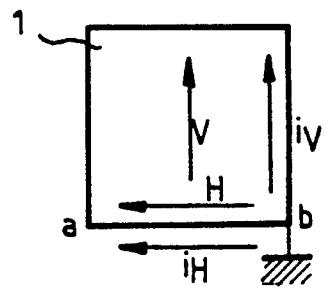

If one now moves the short circuit to point b of the antenna, as shown in FIG. 5, one sees that the sign of the orthogonal field H changes.

The two transistors Qa and Qb thus permit very easily the obtention of a phase modulation with two stages $0-\pi$ of the hyperfrequency wave which is reemitted with horizontal polarization, representing the data to be transmitted to reader L. One notes that these transistors are entirely conventional components which are inexpensive since they must simply be capable of changing the work frequency, that is 2.45 GHz in the application considered here.

Reader L decodes the message received from responder R in processing circuit (14) and it then transmits possibly with an all-or-nothing pulse modulation. This pulse modulation permits the transmission to responder R of either a request for transmission of data contained in another memory zone of the responder or a command for modification of the content of a predetermined memory zone.

At the time of the reception of the all-or-nothing modulation, responder R can, depending on the cases, transmit the data contained in the selected memory zone, or inscribe a message in the destination memory zone.

The system for the transmission of data which has just been described thus certainly presents a very high level of flexibility of use and the low cost of the responder permits considering a great variety of applications, particularly in the railroad transport field.

I claim:

1. Hyperfrequency system for remote data transmission, of the type consisting of at least one reader (L) associated with a plurality/y of responders (R), with the reader (L) comprising means to generate a hyperfrequency wave with a certain rectilinear polarization, while each responder (R) is fitted with a rectangular flat antenna for reemission (1) capable of receiving said hyperfrequency wave and reemitting it with an orthogonal polarization with a phase modulation at two stages representing the data to be transmitted to the reader (L), characterized in that the phase modulation is obtained by two transistors (Qa, Qb) which are connected to the two adjacent corners (a, b) of antenna (1), respectively; these two transistors being alternately blocked and saturated at the rhythm of the data to be transmitted, by additional control signals generated by an appropriate processing unit (4) to alternately short circuit the corresponding corner of the antenna.

2. System according to claim 1, characterized in that the flat antenna (1) of responder (R) is made in the form of a printed circuit on an insulating substrate (2) whose backside which is entirely metallized constitutes reference plane (3).

3. System according to claim 2, characterized in that the two transistors (Qa, Qb) consist of bipolar transistors whose emitter-collector junction is connected between the corresponding corners (a, b) of antenna (1) and reference plane (3), and whose base is connected to processing unit (4).

4. System according to claim 3, characterized in that the flat antenna (1) of responder (R) has a square shape and contains in its center a metallized pole (5) which forms an electrical connection between the active side of the antenna and reference plane (3) located on the back side.

5. System according to any one of claims 1 to 4, characterized in that reader (L) comprises means (12, 14) to modulate the amplitude of the hyperfrequency wave generated, while responder (R) comprises a second flat antenna (6) which is called the reception antenna which is associated with a nonlinear detection element (7), with the detection by the responder of this modulation of amplitude causing the activation of the processing unit (4).

6. System according to claim 5, characterized in that reader (L) comprises in addition means (12, 14) to modulate the pulse of the generated hyperfrequency wave to transmit predetermined data to responder (R).

7. System according to claim 5 or 6, characterized in that the nonlinear detection element (7) consists of a Schottky diode.

8. System according to claim 6, characterized in that the non-linear detection element (7) consists of a Schottky diode.

* * * * *